United States Patent
Greenfield et al.

(10) Patent No.: US 6,702,151 B1
(45) Date of Patent: Mar. 9, 2004

(54) MODULAR BULK DISPLAY AND DISPENSING APPARATUS AND METHOD

(75) Inventors: Benjamin E. Greenfield, 18 Spring St., Noank, CT (US) 06340; Donald E. Barker, Sandy Hook, CT (US); Damian P. Bianchi, Durham, CT (US)

(73) Assignee: Benjamin E. Greenfield, Noank, CT (US)

( * ) Notice: Subject to any disclaimer, the term of this patent is extended or adjusted under 35 U.S.C. 154(b) by 24 days.

(21) Appl. No.: 10/186,869

(22) Filed: Jul. 1, 2002

(51) Int. Cl.⁷ ............................................. G01F 11/00
(52) U.S. Cl. .......................... 222/1; 222/77; 222/135; 222/415
(58) Field of Search ........................... 222/1, 77, 129, 222/135, 156, 415

(56) References Cited

U.S. PATENT DOCUMENTS

| | | | | |
|---|---|---|---|---|
| 1,049,776 A | * | 1/1913 | Stauffer et al. | |
| 1,204,620 A | * | 11/1916 | Vulgamott | 222/622 |
| 2,983,325 A | * | 5/1961 | Moody, Sr. | 177/71 |
| 3,655,098 A | * | 4/1972 | Schnitzler | 222/135 |
| 4,060,111 A | * | 11/1977 | Burks | 140/231 |
| 4,211,343 A | * | 7/1980 | Hughes et al. | 222/130 |
| 4,753,353 A | * | 6/1988 | Kramer | 222/185.1 |
| 5,139,173 A | * | 8/1992 | Evinger | 209/570 |
| 5,240,150 A | * | 8/1993 | Palmon | 222/216 |
| 5,437,393 A | * | 8/1995 | Blicher et al. | 222/77 |
| 5,560,519 A | * | 10/1996 | Moore et al. | 222/129 |
| 5,853,112 A | * | 12/1998 | Coleman et al. | 222/371 |

* cited by examiner

Primary Examiner—Joseph A. Kaufman
(74) Attorney, Agent, or Firm—Arthur Jacob (57) ABSTRACT

Apparatus and method for displaying bulk items and selectively dispensing a designated quantity of the bulk items from a multiplicity of the bulk items upon demand includes containing a multiplicity of bulk items in a volume of the bulk items within a bin and simultaneously conveying bulk items in a horizontal direction toward one end of the bin, adjacent the bottom of the bin, and in a vertically upward direction, adjacent the one end of the bin, to move bulk items from the volume of bulk items to an elevated dispensing outlet, in response to a demand, while at the same time tumbling the bulk items within the volume to separate the bulk items from one another for delivery of the designated quantity of individual, discrete selected bulk items to the dispensing outlet.

14 Claims, 12 Drawing Sheets

MODULAR BULK DISPLAY AND DISPENSING APPARATUS AND METHOD

The present invention relates generally to the display and dispensing of bulk items at a point of sale and pertains, more specifically, to apparatus and method for displaying bulk items and selectively dispensing a selected quantity of the bulk items from a multiplicity of bulk items on display, upon demand.

It has become quite popular to offer for sale bulk items, such as candy, snacks, cereals and other items at various locations, including supermarkets, shopping malls and even movie theaters, in transparent bins from which a purchaser merely scoops a desired quantity and places the scooped items into a bag. While this system has been found to promote sales, there are drawbacks. Thus, the system is prone to spillage, with a concomitant generation of litter and waste. Where unwrapped food items are involved, the system can lead to unsanitary conditions. Further, the system tends to encourage pilferage. Moreover, where the items being dispensed are susceptible to clinging together, such as bulk sticky candies, a purchaser is faced with difficulty in separating the items in order to collect only a desired amount.

The present invention maintains the appeal of a dispensing arrangement which displays bulk items for the selective dispensing of a desired quantity of such items, and does so without the drawbacks outlined above. As such, the present invention attains several objects and advantages, some of which may be summarized as follows: Provides an appealing display of bulk items at a point of sale and effective dispensing of an amount of the displayed items upon demand; enables the display and dispensing of a selected quantity of bulk items at a point of purchase with increased ease and accuracy, and without excessive spillage and waste; promotes sanitary conditions not only during display and dispensing, but during cleaning and re-stocking, as well; facilitates the storage and re-stocking of bulk items to be dispensed at a point of sale; enhances the appeal of bulk items offered for sale at various locations in supermarkets, shopping malls, movie theaters and like venues; simplifies the retrieval of a desired amount of selected bulk items at a point of purchase for encouraging bulk item sales; presents a volume of bulk items for display and dispensing while being essentially sealed against unwanted handling; discourages excessive handling and pilferage; provides a simplified mechanism which is economical to manufacture and install in numerous venues for promoting the sale of a wide variety of bulk items; provides an apparatus which is easy to maintain and is capable of exemplary performance over an extended service life.

The above objects and advantages, as well as further objects and advantages, are attained by the present invention which may be described briefly as a bulk item dispensing module for displaying bulk items and selectively dispensing a designated quantity of the bulk items from a multiplicity of the bulk items upon demand, the dispensing module comprising: a bin for containing a multiplicity of bulk items in a volume of the bulk items, the bin having a lower bottom, an upper top spaced vertically upwardly from the bottom, a first end and a second end opposite the first end and spaced horizontally from the first end; a dispensing outlet at the first end of the bin, adjacent the top of the bin; a conveyor within the bin, the conveyor including a first leg extending generally horizontally between the first and the second end of the bin, adjacent the bottom of the bin, and a second leg extending generally vertically between the first leg of the conveyor and the dispensing outlet, adjacent the first end of the bin, such that the multiplicity of bulk items will rest against the conveyor and will be located between the conveyor, the top of the bin and the second end of the bin; and a drive arrangement for selectively driving the first leg of the conveyor in a direction from the second end toward the first end of the bin, and the second leg of the conveyor in a direction from the bottom toward the top of the bin for moving bulk items from the volume of bulk items to the dispensing outlet, in response to a demand, while simultaneously tumbling the bulk items within the volume to separate the bulk items from one another for delivery of the designated quantity of individual, discrete selected bulk items to the dispensing outlet.

In addition, the present invention includes dispensing apparatus for displaying a variety of bulk items and dispensing bulk items selected from the variety of bulk items, the dispensing apparatus comprising: a frame; a plurality of dispensing modules; a mounting arrangement for mounting each one of the plurality of dispensing modules in the frame for selective removal from and replacement in the frame; each dispensing module comprising: a bin for containing a multiplicity of bulk items in a volume of the bulk items, the bin having a lower bottom, an upper top spaced vertically upwardly from the bottom, a first end and a second end opposite the first end and spaced horizontally from the first end; a dispensing outlet at the first end of the bin, adjacent the top of the bin; a conveyor within the bin, the conveyor including a first leg extending generally horizontally between the first and the second end of the bin, adjacent the bottom of the bin, and a second leg extending generally vertically between the first leg of the conveyor and the dispensing outlet, adjacent the first end of the bin, such that the multiplicity of bulk items will rest against the conveyor and will be located between the conveyor, the top of the bin and the second end of the bin; and a drive arrangement for selectively driving the first leg of the conveyor in a direction from the second end toward the first end of the bin, and the second leg of the conveyor in a direction from the bottom toward the top of the bin for moving bulk items from the volume of bulk items to the dispensing outlet, in response to a demand, while simultaneously tumbling the bulk items within the volume to separate the bulk items from one another for delivery of a plurality of individual, discrete bulk items to the dispensing outlet.

Further, the present invention includes a method for displaying bulk items and selectively dispensing a designated quantity of the bulk items from a multiplicity of the bulk items upon demand, the method comprising: containing a multiplicity of bulk items in a volume of the bulk items within a bin having a lower bottom, an upper top spaced vertically upwardly from the bottom, a first end and a second end opposite the first end and spaced horizontally from the first end; locating a dispensing outlet at the first end of the bin, adjacent the top of the bin; and simultaneously conveying bulk items in a horizontal direction, adjacent the bottom of the bin, and in a vertical direction, adjacent the first end of the bin, to move bulk items from the volume of bulk items to the dispensing outlet, in response to a demand, while simultaneously tumbling the bulk items within the volume to separate the bulk items from one another for delivery of a designated quantity of individual, discrete selected bulk items to the dispensing outlet.

The invention will be understood more fully, while still further objects and advantages will become apparent, in the following detailed description of preferred embodiments of the invention illustrated in the accompanying drawing, in which.

Figure 1:
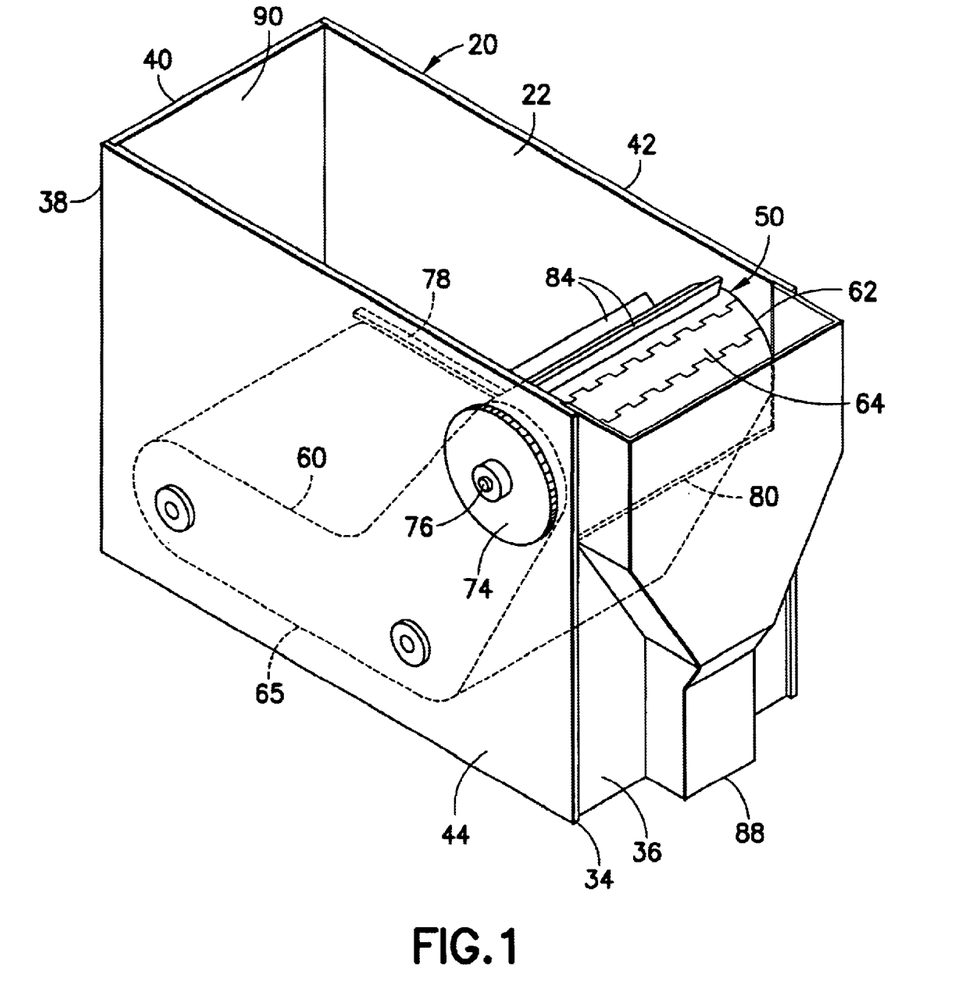
FIG. 1 is a partially diagrammatic, isometric view of a bulk item dispensing module constructed in accordance with the present invention.
Figure 2:
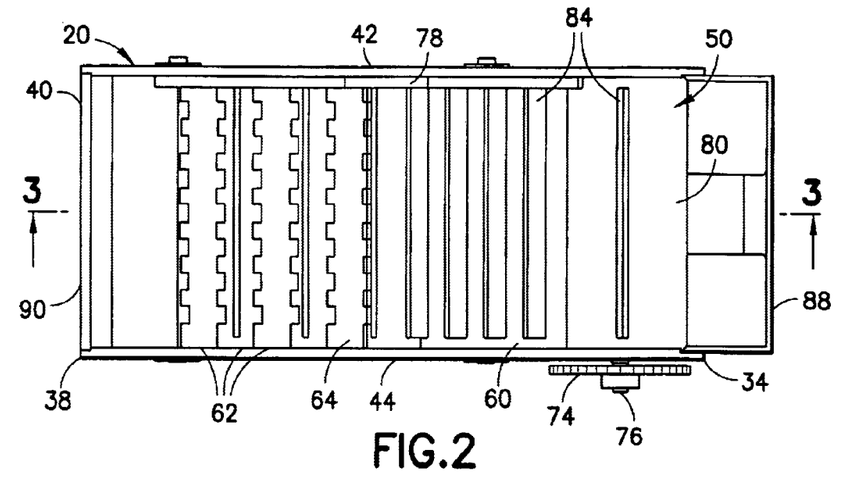
FIG. 2 is a top plan view of the module of FIG. 1.
Figure 3:
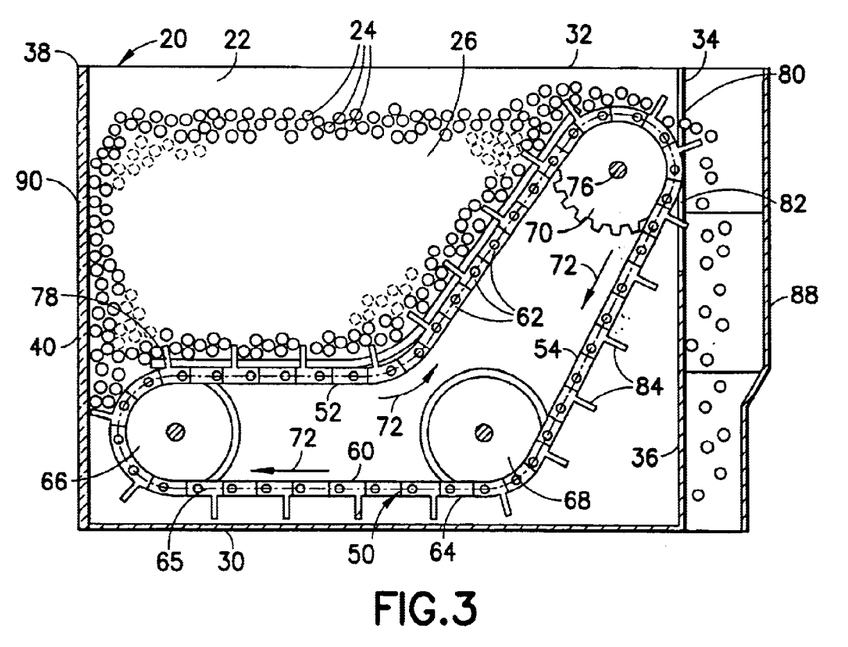
FIG. 3 is a longitudinal cross-sectional view taken along line 3—3 of FIG. 2.

Referring now to the drawing, and especially to FIGS. 1 through 3 thereof, a bulk item dispensing module constructed in accordance with the present invention is shown at 20 and is seen to include a bin 22 for containing a multiplicity of individual, discrete items 24 in bulk in a volume 26 of bulk items. Bin 22 includes a lower bottom 30, an upper top 32 spaced vertically upwardly from the bottom 30, a first end 34 at an end wall 36, a second end 38 at an end wall 40 spaced horizontally from end wall 36, in a longitudinal direction, and laterally opposite side walls 42 and 44.

A conveyor 50 is placed within the bin 22 and includes a first leg 52 oriented generally horizontally and extending longitudinally between the second end 38 and the first end 34 of the bin 22, adjacent the bottom 30 of the bin 22. A second leg 54 of the conveyor 50 is oriented generally vertically and extends upwardly from the first leg 52 toward the top 32 of the bin 22, adjacent the first end 34 of the bin 22, so that the conveyor 50 has a generally L-shaped profile configuration. The volume 26 of bulk items 24 rests against the conveyor 50 and is located between the conveyor 50, the top 32 of the bin 22, and the end wall 40 at the second end 38 of the bin 22.

In the preferred construction, conveyor 50 includes a conveyor belt 60 common to both the first and second legs 52 and 54, the conveyor belt 60 having a plurality of links 62 along the length of the conveyor belt 60. Links 62 each have a lateral width essentially spanning the distance between side walls 42 and 44 of bin 22, and an upper surface 64. The plurality of links 62 follow the generally L-shaped profile configuration of conveyor 50, along a path of travel 65 extending around a first idler 66, a second idler 68 and a drive sprocket 70 which engages the links 62 to drive the conveyor belt 60 along the path of travel 65 in the direction of arrows 72, in response to rotation of the drive sprocket 70 by an external actuator 74 located outside the bin 22 and coupled to the drive sprocket 70 through a drive shaft 76. A guide rail 78 is integral with side wall 42 and has an L-shaped profile contour corresponding to the L-shaped profile configuration of the conveyor 50. Guide rail 78 extends laterally from the side wall 42 to engage a portion of the upper surface 64 of each link 62 adjacent side wall 42 so as to guide the conveyor belt 60 in the L-shaped profile configuration along the path of travel 65 of the links 62.

A dispensing outlet 80 is located at the first end 34 of the bin 22 and is in the form of an opening 82 in end wall 36 placed adjacent the top 32 of the bin 22. The second leg 54 of conveyor 50 extends upwardly from the first leg 52 to the opening 82 so that upon movement of the conveyor belt 60 in the direction of arrows 72 bulk items 24 resting against the conveyor belt 60 will be moved by the first leg 52 of the conveyor 50 in the direction from the second end 38 of the bin 22 toward the first end 34 of the bin 22, and will be lifted from the volume 26 by the second leg 54 of the conveyor 50 to be moved to the opening 82 in end wall 36 and thereby delivered to and passed through dispensing outlet 80. In addition to accomplishing the desired delivery of bulk items 24 from the volume 26 to the dispensing outlet 80, the arrangement where the volume 26 rests against the generally L-shaped conveyor 50 effects tumbling of the bulk items 24 within the volume 26 upon operation of the conveyor 50, simultaneous with dispensing movement of the bulk items 24, so as to separate any agglomerated bulk items 24 from one another for delivery of essentially individual, discrete items 24 to the dispensing outlet.

In order to facilitate movement of the bulk items 24 by the conveyor belt 60, the preferred construction provides pushers in the form of a paddle 84 extending upwardly from the upper surface 64 of at least some of the links 62 to engage the bulk items 24 as the conveyor belt 60 moves along the path of travel 65, each paddle 84 preferably being integral with a corresponding link 62 and extending essentially fully along the lateral width of the link 62. Paddles 84 enhance the ability of the conveyor 50 to tumble the bulk items 24, as described above, while at the same time providing an agitation of the bulk items 24 to further accomplish separation of any agglomerated bulk items 24 for facilitating the dispensing of discrete items 24. Upon passing through the dispensing outlet 80, the items 24 fall into a delivery chute 88 located at the first end 34 of the bin 22 for delivery of the dispensed items 24 to a purchaser.

Module 20 enables convenient storage, display and dispensing of bulk items 24, all in a single module. The incorporation of conveyor 50 within the bin 22 of module 20 allows ready handling of bulk items 24 stored and dispensed from the bin 22. The configuration of the conveyor 50, together with the construction of the bin 22, allows the bulk items 24 contained within the bin 22 to be viewed for ready selection by a purchaser and for subsequent dispensing to the purchaser. In this connection, a window is provided at 90 in the end wall 40 by constructing end wall 40 of a transparent material, such as a transparent synthetic polymeric material. A purchaser will view the bulk items 40 through the window 90 and, upon deciding to purchase a quantity of the bulk items 24, will operate the conveyor 50 by actuating the drive sprocket 70 to deliver bulk items 24 from the volume 26 resting against the conveyor 50 to the dispensing outlet 80 where the bulk items 24 will enter the delivery chute 88 to be delivered to the purchaser.

Figure 4:
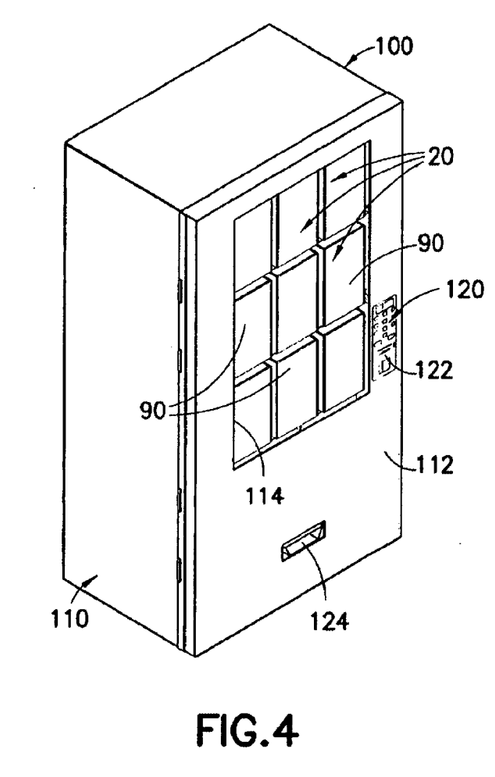
FIG. 4 is a front, top, left side pictorial view of a dispensing apparatus constructed in accordance with the present invention.
Figure 5:
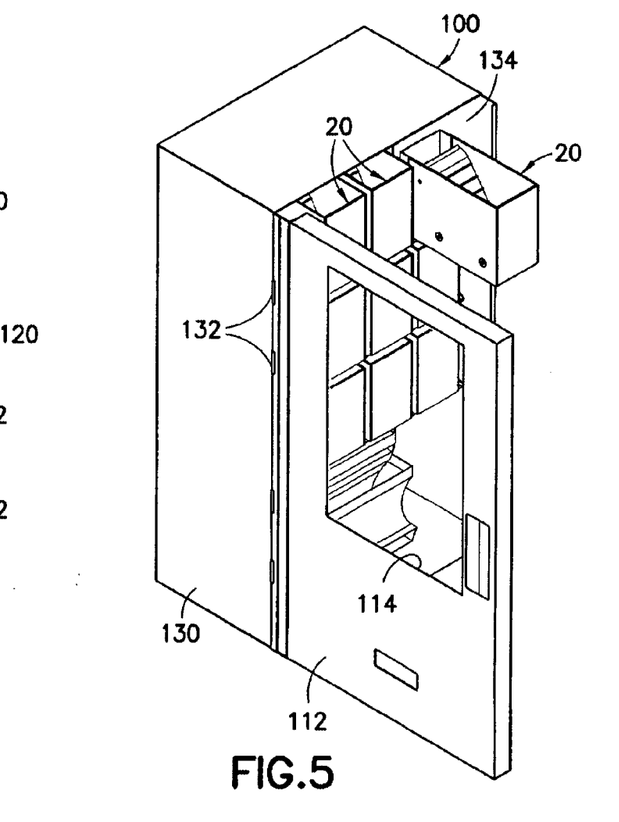
FIG. 5 is a pictorial view similar to FIG. 4, but with component parts in another position.
Figure 6:
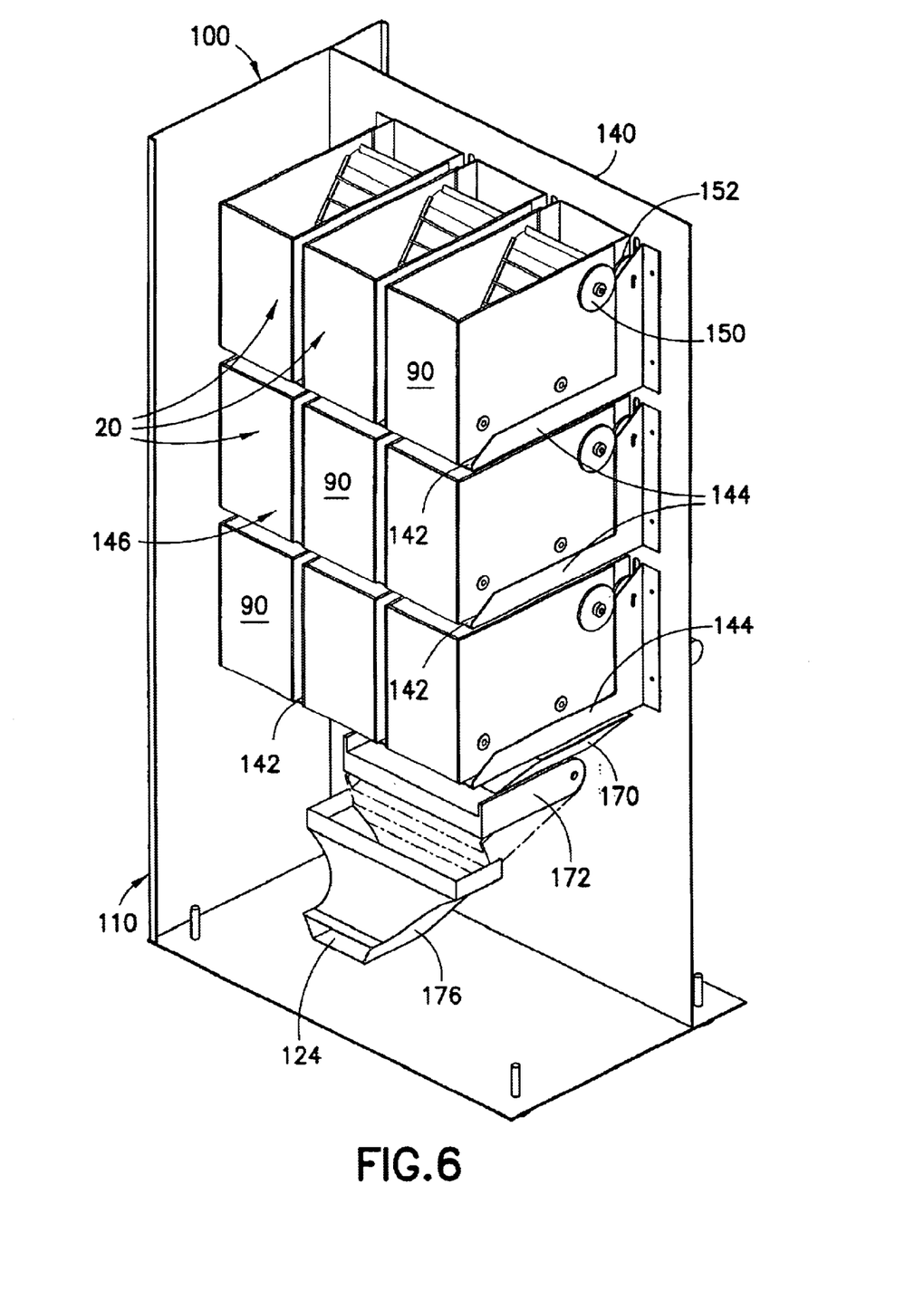
FIG. 6 is a fragmentary front, top, right side isometric view, partially diagrammatic, illustrating an internal arrangement of the apparatus.

In the embodiment of the invention illustrated in FIGS. 4 and 5, a plurality of modules 20 are placed within a common dispensing apparatus shown at 100. Apparatus 100 includes a housing 110 within which the plurality of modules 20, here shown as nine modules 20, are mounted for presenting a variety of bulk items for selection by a purchaser at a point of sale. Housing 110 includes a front panel 112 having a viewing window 114 enabling the purchaser to view all of the modules 20 and, concomitantly, the contents of the bin 22 of each module 20 through the window 90 provided by transparent end wall 40 of each bin 22. A control system 120 includes a control panel 122 in position to be operated by a purchaser at the point of sale and enables the purchaser to select a desired quantity of a particular bulk item 24 available in any one of the modules 20 and to receive the selected items 24 at a dispensing exit 124, upon receipt of an appropriate payment at the control panel 122.

As seen in FIG. 5, front panel 112 is hinged to a side panel 130 of the housing 110, at 132, so as to enable authorized access to the modules 20 for service and replenishment purposes. Thus, any of the modules 20 may be removed by authorized personnel for re-stocking of the bulk items 24, or for service, repair or replacement of the module 20. In particular, cleaning of the modules 20 is facilitated by enabling complete removal of each module 20 from the housing 110, as illustrated at 134, allowing an entire module 20 to be subjected to a cleaning procedure, such as immersion in a cleaning medium, especially for maintaining superior sanitary conditions when the bulk items 24 are food items, such as candy, snacks, cereal and the like.

Figure 7:
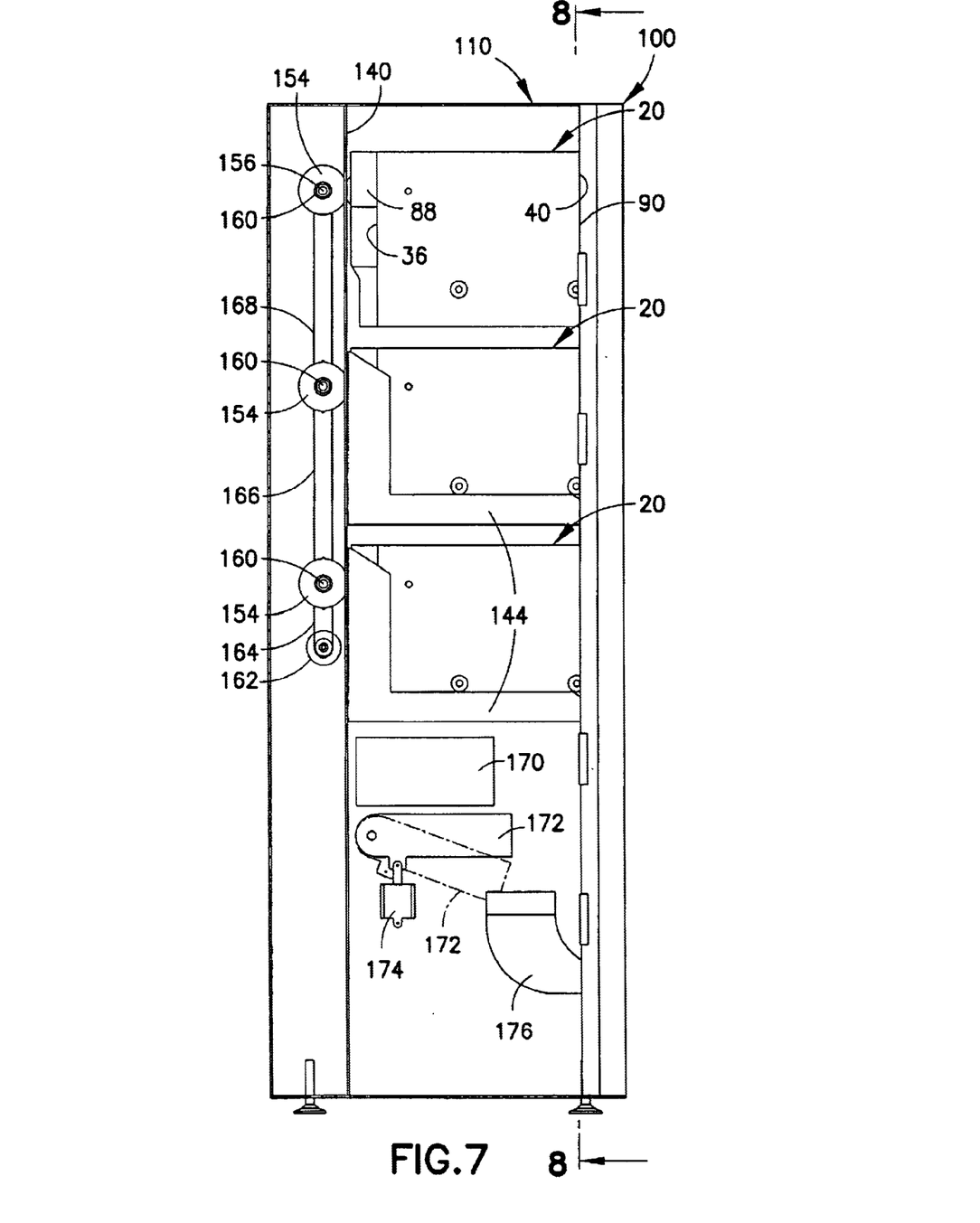
FIG. 7 is a partially diagrammatic left side elevational view of the apparatus with portions of the apparatus removed to expose internal component parts.
Figure 8:
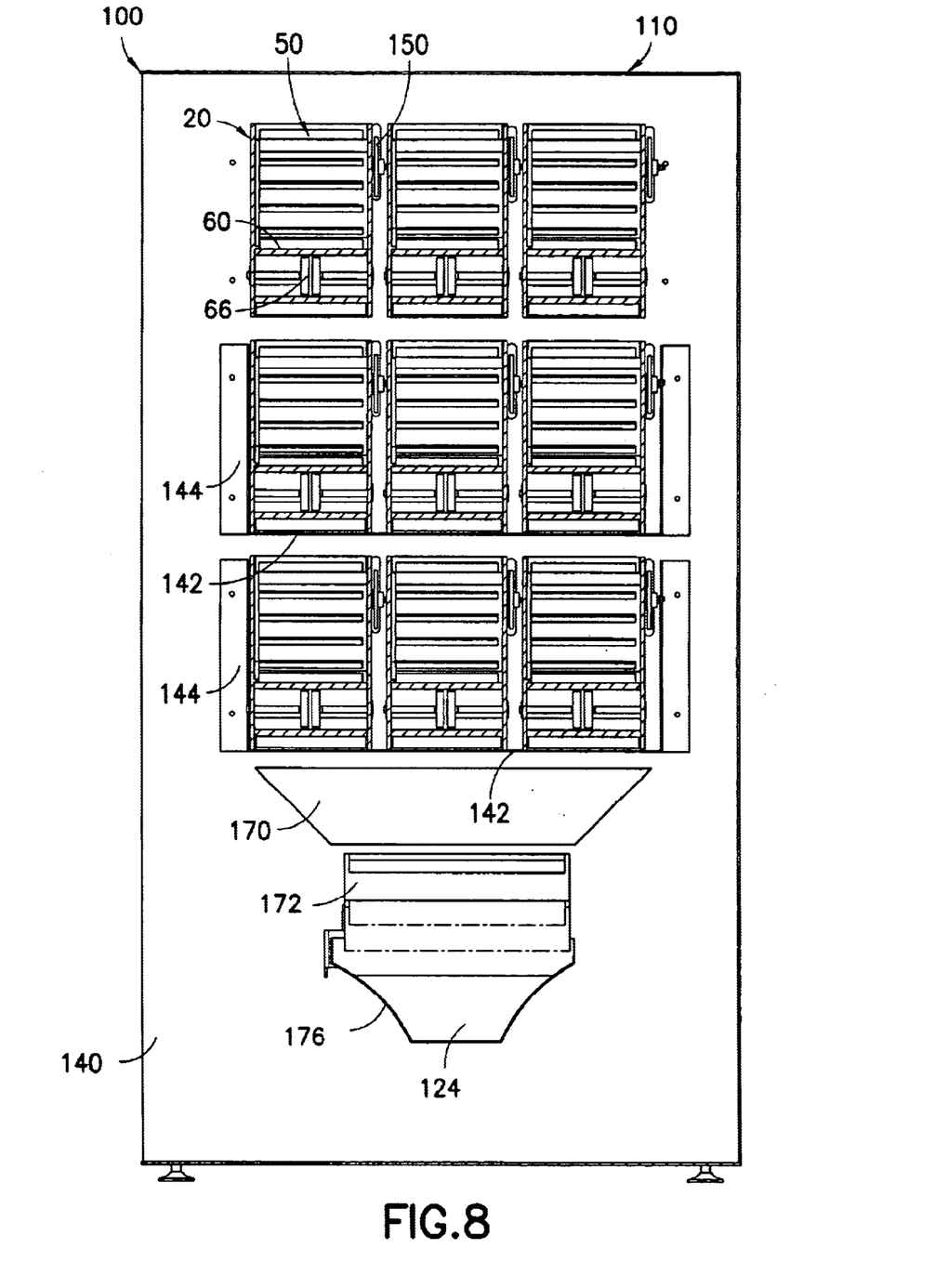
FIG. 8 is a partially diagrammatic cross-sectional view taken along line 8—8 of FIG. 7.
Figure 9:
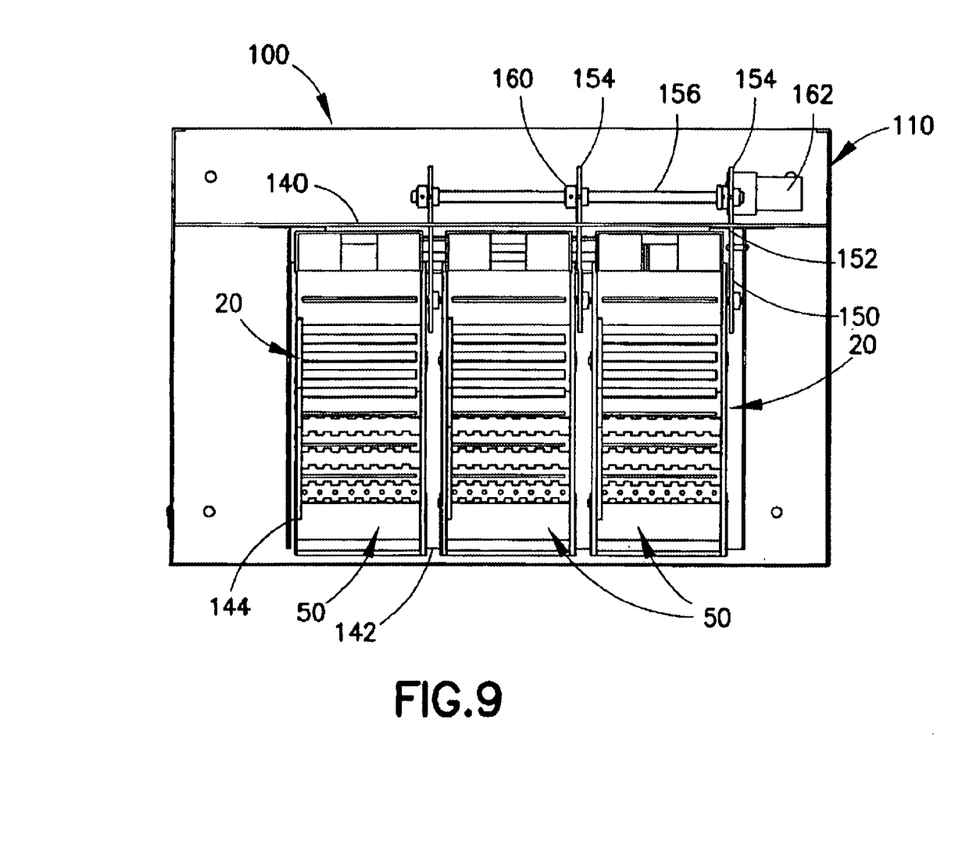
FIG. 9 is a partially diagrammatic top plan view of the apparatus with portions of the apparatus removed to expose internal component parts.
Figure 10:
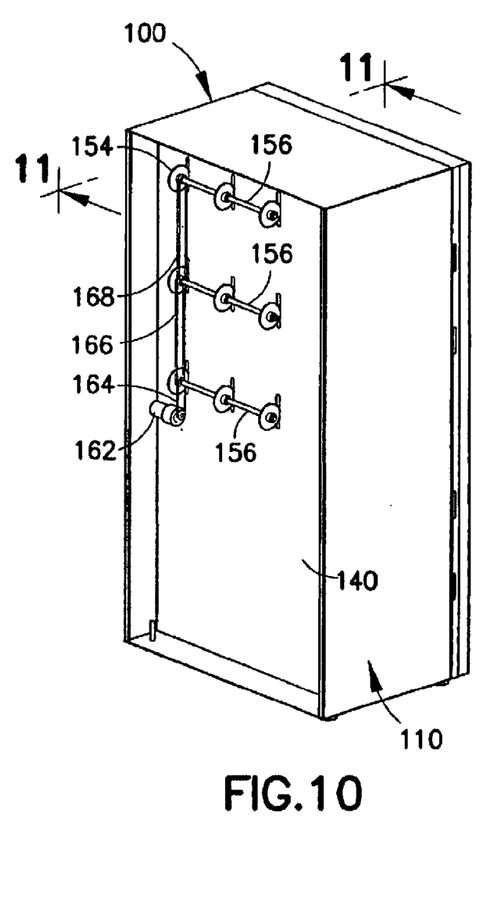
FIG. 10 is a rear, top, left side pictorial view of the apparatus.
Figure 11:
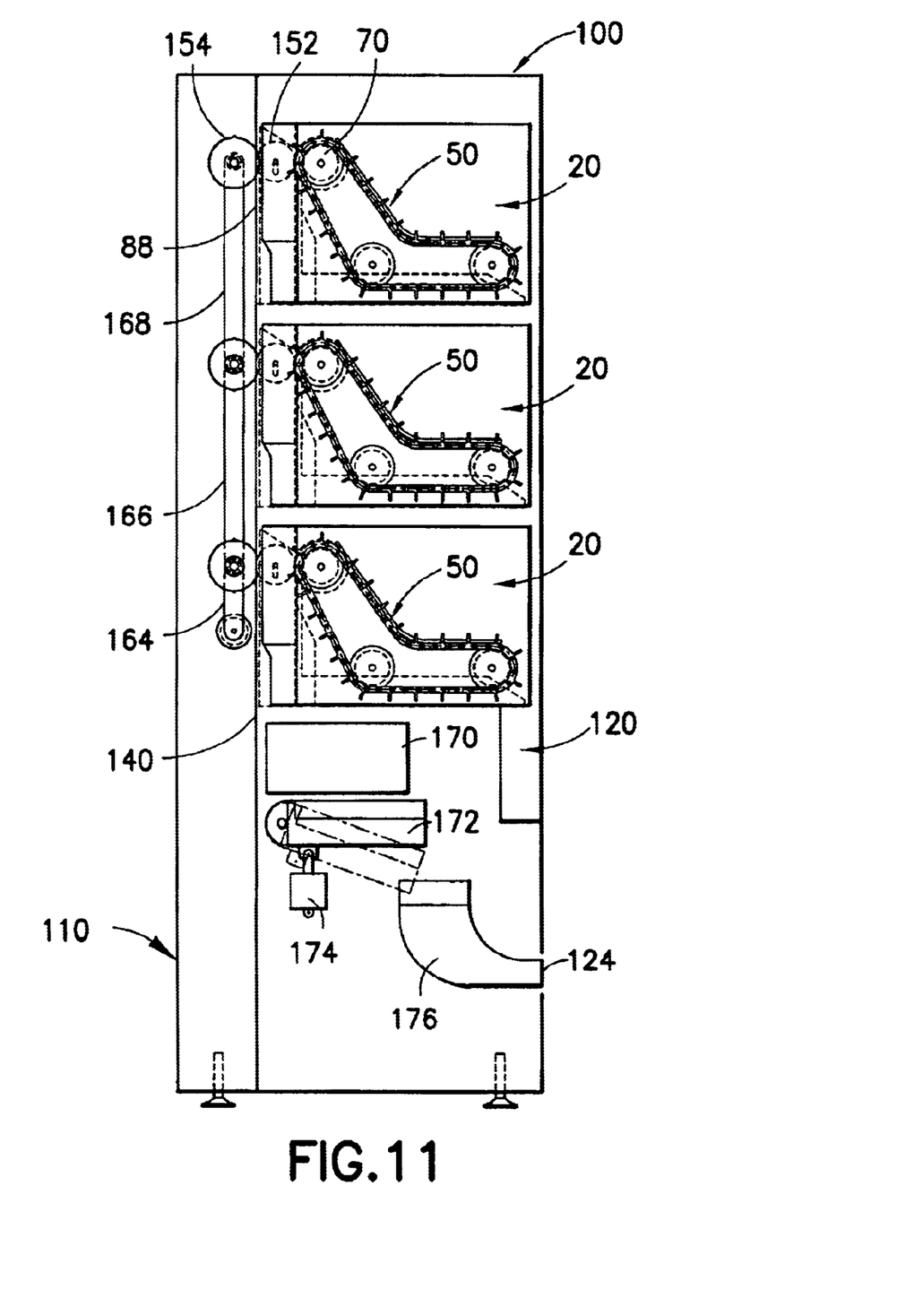
FIG. 11 is an enlarged, partially diagrammatic cross-sectional view taken along line 11—11 of FIG. 10.

Turning now to FIGS. 6 through 11, the modules 20 are mounted upon a frame 140 to establish a matrix of modules 20 within the housing 110. Each module 20 is supported on a shelf 142 affixed to the frame 140 by brackets 144 secured to the frame 140. With the placement of each module 20 at its designated position within the matrix of modules 20, as shown at 146 in FIG. 6, the end wall 36 of each module 20 is located adjacent the frame 140, while the opposite end wall 40 is located for viewing window 90 through the viewing window 114. External actuator 74 is in the form of a driven gear 150 affixed to drive shaft 76 for rotation with the drive shaft 76. Upon sliding each module 20 into place at its designated position on frame 140, corresponding driven gear 150 is meshed with a counterpart idler gear 152 which is journaled for rotation on a corresponding bracket 144 and which itself is meshed with a corresponding drive gear 154 coupled for selective rotation with an intermediate drive shaft 156, jounaled upon frame 140, through a clutch 160, as seen in FIGS. 7, 10 and 11. A drive motor 162 rotates each intermediate drive shaft 156 through drive belts 164, 166 and 168.

With each module 20 in place within the housing 110, and with the front panel 112 closed, as illustrated in FIGS. 4 and 7, a purchaser makes a selection at the control panel 122 and renders payment to generate a demand for a designated quantity of bulk items 24. In response to the demand, the control system 120 activates the drive motor 162 and actuates the particular clutch 160 which corresponds to the selection made by the purchaser, thus operating the conveyor 50 of the corresponding module 20 to deliver bulk items 24 from the bin 22 of that module 20 to the delivery chute 88 of the module 20. The bulk items 24 delivered to the delivery chute 88 fall to a hopper 170 located beneath the matrix 146 of modules 20 and common to the delivery chutes 88 of all of the modules 20 of the matrix 146. Hopper 170 transfers the fallen bulk items 24 to a scale 172 which is mounted upon the frame 140 for pivotal movement between a receiving position, shown in full lines in FIGS. 6 and 7, and a discharge position, shown in phantom in FIGS. 6 and 7. In response to the reception of a selected quantity, by weight, of bulk items 24 in the scale 172, with the scale 172 in the receiving position, control system 120 operates an actuator in the form of a solenoid 174 coupled to the scale 172 to move the scale 172 from the receiving position to the discharge position, thereby dropping the measured quantity of bulk items 24 into an exit chute 176 for delivery to the dispensing exit 124 where the purchaser then acquires the designated, measured quantity of selected bulk items 24.

Figure 12:
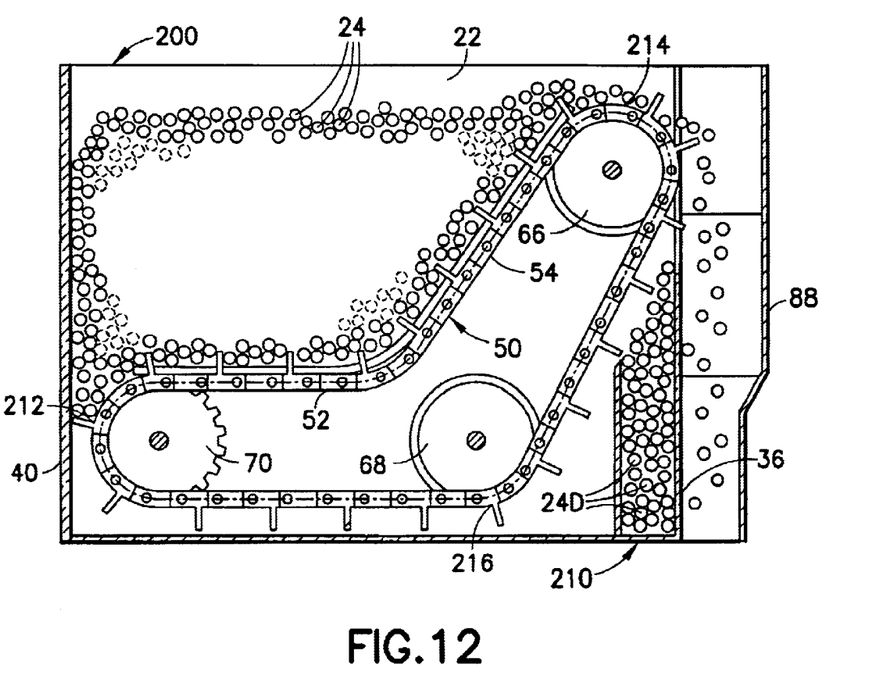
FIG. 12 is a longitudinal cross-sectional view similar to FIG. 3, but showing another module constructed in accordance with the present invention.
Figure 13:
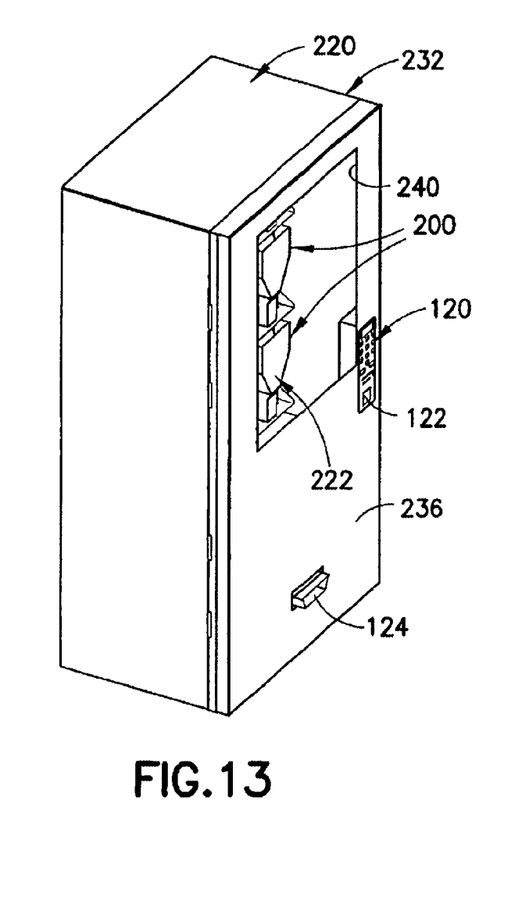
FIG. 13 is a front, top, left side pictorial view of another dispensing apparatus constructed in accordance with the present invention.
Figure 14:
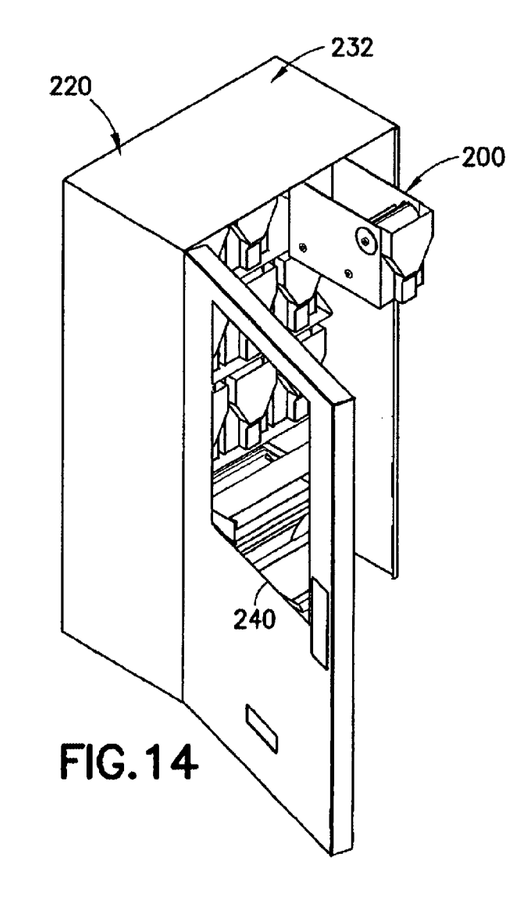
FIG. 14 is a pictorial view similar to FIG. 13, but with component parts in another position.
Figure 15:
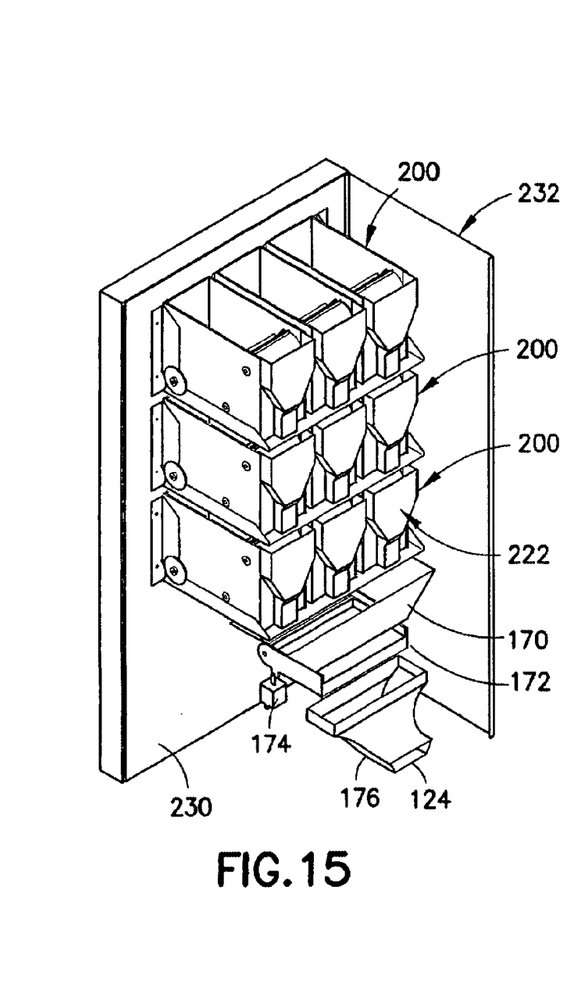
FIG. 15 is a fragmentary front, top, left side isometric view, partially diagrammatic, illustrating an internal arrangement of the apparatus.
Figure 16:
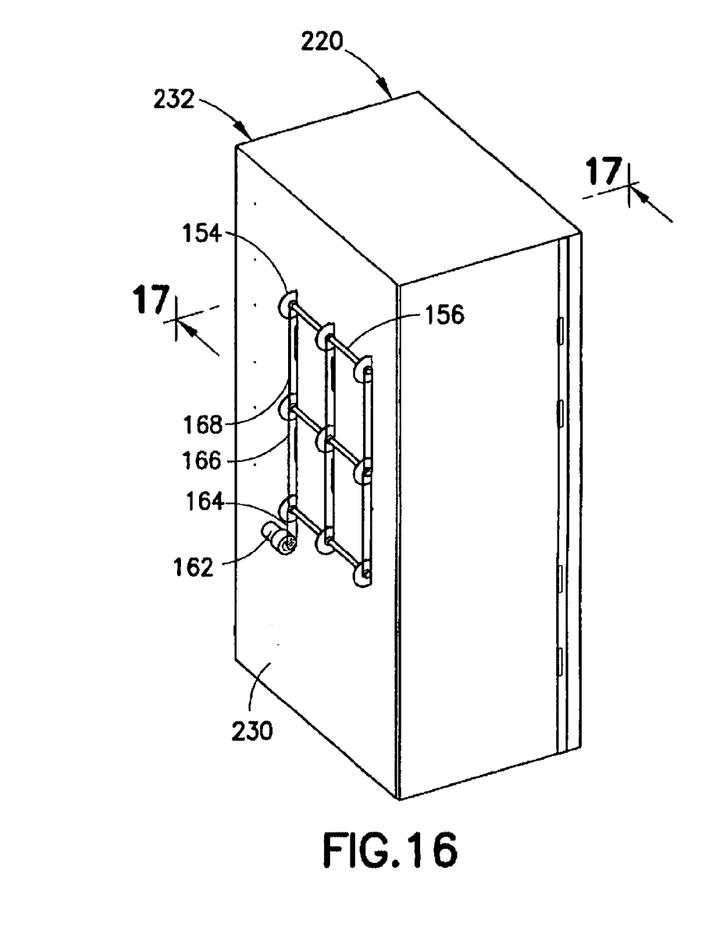
FIG. 16 is rear, top, left side pictorial view of the dispensing apparatus.
Figure 17:
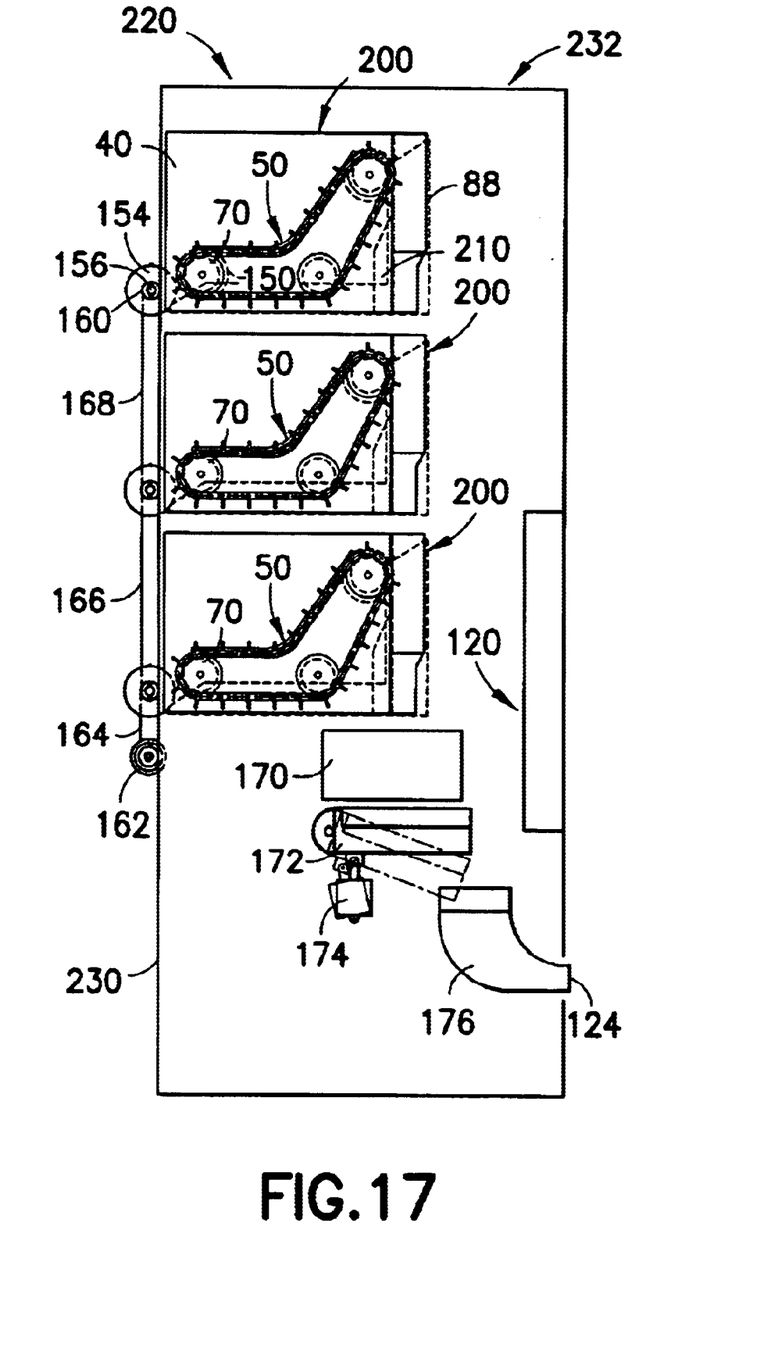
FIG. 17 is an enlarged, partially diagrammatic cross-sectional view taken along line 17—17 of FIG. 16.

In the embodiment of FIG. 12, a module 200 is constructed somewhat similar to module 20, and like parts are identified with like reference characters. However, in module 200 a separate display chamber 210 is located along the end wall 36, and both the end wall 36 and the delivery chute 88 are constructed of a transparent material. The bulk items 24 contained within the bin 22 are supplemented by like bulk items 24D placed within the display chamber 210, and the drive sprocket 70 is located adjacent the end wall 40, at lower end 212 of the L-shaped conveyor 50, rather than adjacent the opposite end wall 36, and idlers 66 and 68 are located, respectively, at upper end 214 of conveyor 50, adjacent the opposite end wall 36, and at intersection 216 of the legs 52 and 54 of the conveyor 50.

In an alternate dispensing apparatus 220 illustrated in FIGS. 13 through 17, the modules 200 are mounted in a matrix 222 with the end wall 40 of each module 200 adjacent frame 230 in housing 232, and the display chamber 210 adjacent front panel 236 of the housing 232, for enabling viewing of the display chambers 210 through viewing window 240 in the front panel 236. Apparatus 220 is operated in the same manner as described above in connection with dispensing apparatus 100. That is, selections and payments made at control panel 122 generate a demand which activates control system 120 to actuate drive motor 162 and a corresponding clutch 160 so as to operate the conveyor 50 of a particular module 200 for delivery of the designated bulk items 24 to hopper 170 and then to scale 172. In this instance, drive gear 154 is meshed directly with driven gear 150. Upon delivery of the prescribed amount, by weight, of the designated bulk items 24, solenoid 174 is actuated by the control system 120 to pivot the scale 172 and discharge the designated, measured quantity of the selected bulk items 24 to exit chute 176 for delivery to the purchaser at dispensing exit 124.

It will be seen that the present invention attains all of the objects and advantages summarized above, namely: Provides an appealing display of bulk items at a point of sale and effective dispensing of an amount of the displayed items upon demand; enables the display and dispensing of a selected quantity of bulk items at a point of purchase with increased ease and accuracy, and without excessive spillage and waste; promotes sanitary conditions not only during display and dispensing, but during cleaning and re-stocking, as well; facilitates the storage and re-stocking of bulk items to be dispensed at a point of sale; enhances the appeal of bulk items offered for sale at various locations in supermarkets, shopping malls, movie theaters and like venues; simplifies the retrieval of a desired amount of selected bulk items at a point of purchase for encouraging bulk item sales; presents a volume of bulk items for display and dispensing while being essentially sealed against unwanted handling; discourages excessive handling and pilferage; provides a simplified mechanism which is economical to manufacture and install in numerous venues for promoting the sale of a wide variety of bulk items; provides an apparatus which is easy to maintain and is capable of exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A bulk item dispensing module for displaying bulk items and selectively dispensing a designated quantity of the bulk items from a multiplicity of the bulk items upon demand, the dispensing module comprising:
   a bin for containing a multiplicity of bulk items in a volume of the bulk items, the bin having a lower bottom, an upper top spaced vertically upwardly from the bottom, a first end and a second end opposite the first end and spaced horizontally from the first end;
   a dispensing outlet at the first end of the bin, adjacent the top of the bin;
   a conveyor within the bin, the conveyor including a first leg extending generally horizontally between the first and the second end of the bin, adjacent the bottom of the bin, and a second leg extending generally vertically between the first leg of the conveyor and the dispensing outlet, adjacent the first end of the bin, such that the multiplicity of bulk items will rest against the conveyor and will be located between the conveyor, the top of the bin and the second end of the bin; and
   a drive arrangement for selectively driving the first leg of the conveyor in a direction from the second end toward the first end of the bin, and the second leg of the conveyor in a direction from the bottom toward the top of the bin for moving bulk items from the volume of bulk items to the dispensing outlet, in response to a demand, while simultaneously tumbling the bulk items within the volume to separate the bulk items from one another for delivery of the designated quantity of individual, discrete selected bulk items to the dispensing outlet.

2. The invention of claim 1 wherein the conveyor includes pushers for extending into the volume of bulk items for lifting bulk items along the second leg of the conveyor while simultaneously agitating the bulk items in the volume of bulk items.

3. The invention of claim 1 wherein the first leg of the conveyor is integrated with the second leg of the conveyor so as to provide the conveyor with a generally L-shaped profile configuration.

4. The invention of claim 3 wherein the conveyor includes a conveyor belt extending along both the first leg and the second leg.

5. The invention of claim 1 wherein the bin includes a window for enabling viewing of bulk items in the volume of bulk items contained within the bin.

6. The invention of claim 5 wherein the bin includes an end wall at the second end of the bin, and the window is located at the end wall.

7. The invention of claim 1 wherein the dispensing module includes a display chamber for containing additional bulk items corresponding to the bulk items contained within the bin, the display chamber being located for enabling viewing of the additional bulk items.

8. The invention of claim 7 wherein the display chamber is located adjacent the first end of the bin.

9. Dispensing apparatus for displaying a variety of bulk items and dispensing bulk items selected from the variety of bulk items, the dispensing apparatus comprising:
   a frame;
   a plurality of dispensing modules;
   a mounting arrangement for mounting each one of the plurality of dispensing modules in the frame for selective removal from and replacement in the frame;
   each dispensing module comprising:
      a bin for containing a multiplicity of bulk items in a volume of the bulk items, the bin having a lower bottom, an upper top spaced vertically upwardly from the bottom, a first end and a second end opposite the first end and spaced horizontally from the first end;
      a dispensing outlet at the first end of the bin, adjacent the top of the bin;
      a conveyor within the bin, the conveyor including a first leg extending generally horizontally between the first and the second end of the bin, adjacent the bottom of the bin, and a second leg extending generally vertically between the first leg of the conveyor and the dispensing outlet, adjacent the first end of the bin, such that the multiplicity of bulk items will rest against the conveyor and will be located between the conveyor, the top of the bin and the second end of the bin; and
      a drive arrangement for selectively driving the first leg of the conveyor in a direction from the second end toward the first end of the bin, and the second leg of the conveyor in a direction from the bottom toward the top of the bin for moving bulk items from the volume of bulk items to the dispensing outlet, in response to a demand, while simultaneously tumbling the bulk items within the volume to separate the bulk items from one another for delivery of a plurality of individual, discrete bulk items to the dispensing outlet.

10. The invention of claim 9 wherein the dispensing apparatus includes a delivery outlet for delivering the selected plurality of bulk items, each dispensing module includes an individual delivery chute communicating with a corresponding dispensing outlet, and the dispensing apparatus includes a common delivery chute communicating with each individual delivery chute and the delivery outlet.

11. The invention of claim 9 wherein the dispensing apparatus includes a drive motor and a coupling arrangement for selective coupling of the drive motor with the drive arrangement of a dispensing module containing the bulk items selected from the variety of bulk items.

12. The invention of claim 9 wherein the first leg of the conveyor is integrated with the second leg of the conveyor so as to provide the conveyor with a generally L-shaped profile configuration.

13. The invention of claim 12 wherein the conveyor includes a conveyor belt extending along both the first leg and the second leg.

14. A method for displaying bulk items and selectively dispensing a designated quantity of the bulk items from a multiplicity of the bulk items upon demand, the method comprising:
   containing a multiplicity of bulk items in a volume of the bulk items within a bin having a lower bottom, an upper top spaced vertically upwardly from the bottom, a first end and a second end opposite the first end and spaced horizontally from the first end;

locating a dispensing outlet at the first end of the bin, adjacent the top of the bin;

simultaneously conveying bulk items in a horizontal direction, adjacent the bottom of the bin, and in a vertical direction, adjacent the first end of the bin, to move bulk items from the volume of bulk items to the dispensing outlet, in response to a demand, while simultaneously tumbling the bulk items within the volume to separate the bulk items from one another for delivery of a designated quantity of individual, discrete selected bulk items to the dispensing outlet.

* * * * *